US008258936B2

(12) United States Patent
Mahalingaiah

(10) Patent No.: US 8,258,936 B2
(45) Date of Patent: Sep. 4, 2012

(54) METHOD AND SYSTEM FOR ACQUIRING INTEGRATED OPERATIONAL AND SUPPORT DATA FOR A VEHICLE

(75) Inventor: Pradeep Mahalingaiah, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 816 days.

(21) Appl. No.: 12/253,498

(22) Filed: Oct. 17, 2008

(65) Prior Publication Data

US 2010/0097201 A1 Apr. 22, 2010

(51) Int. Cl.

| | |
|---|---|
| ***B60Q 1/00*** | (2006.01) |
| *G08B 21/00* | (2006.01) |
| *G08B 13/00* | (2006.01) |
| *G06F 7/00* | (2006.01) |
| *G06F 19/00* | (2006.01) |
| *G06F 17/00* | (2006.01) |
| *B60G 23/00* | (2006.01) |

(52) U.S. Cl. ........ 340/438; 340/945; 340/574; 340/540; 701/36; 701/38; 701/39; 701/42

(58) Field of Classification Search .................. 340/438; 701/29, 33

See application file for complete search history.

(56) References Cited

U.S. PATENT DOCUMENTS

| | | | | |
|---|---|---|---|---|
| 5,931,877 | A | 8/1999 | Smith et al. | |
| 5,974,349 | A | 10/1999 | Levine | |
| 6,134,500 | A | 10/2000 | Tang et al. | |
| 6,522,867 | B1 | 2/2003 | Wright et al. | |
| 6,745,010 | B2 | 6/2004 | Wright et al. | |
| 7,103,456 | B2 | 9/2006 | Bloch et al. | |
| 7,113,852 | B2 * | 9/2006 | Kapadia et al. | 701/36 |
| 7,269,761 | B2 | 9/2007 | Yi | |
| 2002/0143443 | A1 | 10/2002 | Betters et al. | |
| 2002/0198639 | A1 | 12/2002 | Ellis et al. | |
| 2003/0071743 | A1 * | 4/2003 | Seah et al. | 340/945 |
| 2004/0105427 | A1 | 6/2004 | Friedrich et al. | |
| 2004/0106404 | A1 | 6/2004 | Gould et al. | |
| 2004/0138933 | A1 * | 7/2004 | LaComb et al. | 705/7 |
| 2005/0065682 | A1 * | 3/2005 | Kapadia et al. | 701/35 |

(Continued)

FOREIGN PATENT DOCUMENTS

DE 202006005089 U1 6/2006

(Continued)

OTHER PUBLICATIONS

Bapst, G. et al. (2002); Portable Maintenance Aids, LG005T2, Logistics Management Institute, Jul. 2001; <URL: http://oai.dtic.mil/oai/oai?verb=getRecord&metadataPrefix=html&identifier=ADA393260>.

(Continued)

*Primary Examiner* — George Bugg
*Assistant Examiner* — Jack Wang
(74) *Attorney, Agent, or Firm* — Ingrassia Fisher & Lorenz, P.C.

(57) ABSTRACT

Methods and apparatus are provided for acquiring integrated operational data and support data regarding a vehicle. The apparatus comprising a network interface for communicating with the vehicle and a processor that is coupled to the network interface. The processor is configured to transmit a first request for operational data to the vehicle, receive the requested operational data from the vehicle, the requested operational data including at least one event indicator, and retrieve the support data that corresponds to a selected event indicator from a stored location.

20 Claims, 2 Drawing Sheets

U.S. PATENT DOCUMENTS

| | | | | |
|---|---|---|---|---|
| 2007/0083303 | A1* | 4/2007 | O'Sullivan et al. | 701/29 |
| 2007/0086482 | A1* | 4/2007 | Pruzan et al. | 370/466 |
| 2007/0115938 | A1 | 5/2007 | Conzachi et al. | |
| 2007/0124223 | A1 | 5/2007 | Avery et al. | |
| 2007/0183435 | A1 | 8/2007 | Kettering et al. | |
| 2008/0040152 | A1 | 2/2008 | Vian et al. | |
| 2008/0080458 | A1* | 4/2008 | Cole | 370/342 |
| 2008/0154448 | A1* | 6/2008 | Mead et al. | 701/14 |
| 2008/0167758 | A1* | 7/2008 | Louch et al. | 701/2 |
| 2009/0112460 | A1* | 4/2009 | Baker et al. | 701/208 |
| 2009/0192659 | A1 | 7/2009 | Beebe et al. | |

FOREIGN PATENT DOCUMENTS

| | | | |
|---|---|---|---|
| EP | 0843244 | A1 | 5/1998 |
| EP | 1837817 | A2 | 9/2007 |
| EP | 1947624 | A1 | 7/2008 |
| WO | 0055770 | | 9/2000 |
| WO | 0217131 | A2 | 2/2002 |

OTHER PUBLICATIONS

Gooding, M. et al.; Portable Maintenance Aid Instrument Pack (PIP), AUTOTESTCON '98, IEEE Systems Readiness Technology Conference, 1998 IEEE, Aug. 1998; <URL:http//ieeexplore.ieee.org/xpl/freeabs_all.jsp?arnumber=713452>.

Clinton, J. T.; The Revolution of the Aircraft Engine Ground Maintenance Station; Mar. 20, 2001, Aerospace Conference, 2001, IEEE Proceedings, Mar. 10-17, 2001, Piscataway, NJ, USA, IEEE, pp. 2927-2935, XP 010548416.

EP Search Report dated Dec. 7, 2009, EP 09173080.4-2221.

European Office Action dated May 21, 2010.

* cited by examiner

METHOD AND SYSTEM FOR ACQUIRING INTEGRATED OPERATIONAL AND SUPPORT DATA FOR A VEHICLE

TECHNICAL FIELD

The present invention generally relates to vehicle maintenance systems, and more particularly relates to a system and method for acquiring integrated operational and support data for a vehicle.

BACKGROUND

Modern aircraft are often configured with various systems that provide data describing the aircraft's operational state. For example, the aircraft may include a central maintenance computer (or other computer system) that collects and stores operational data generated by various systems onboard the aircraft. A mechanic (or other maintenance personnel) may then utilize a maintenance terminal to interrogate the central computer system and identify event indicators that are associated with one or more operational issues on the aircraft. These event indicators also correspond to aircraft support data that further describes the operational issues and/or how to address them. The aircraft support data may be in the form of an aircraft maintenance manual.

This process for diagnosing an aircraft operational issue requires the mechanic remain at a fixed location on the aircraft (e.g., positioned at the maintenance terminal). Thus, the mechanic is required to board the aircraft in order to review the operational data. The mechanic must then go to the appropriate region on the aircraft to address the operational issue by, for example, replacing one or more Line Replaceable Units (LRUs). Thus, the user of a single maintenance terminal to view operational data may lead to increased repair times and return-to-service times for the aircraft.

Accordingly, it is desirable to provide a method for providing integrated operational data and support data for a vehicle to a remote device. Furthermore, other desirable features and characteristics of the present invention will become apparent from the subsequent detailed description of the invention and the appended claims, taken in conjunction with the accompanying drawings and this background of the invention.

BRIEF SUMMARY

An apparatus is provided for acquiring integrated operational data and support data regarding a vehicle. The apparatus comprising a network interface for communicating with the vehicle and a processor that is coupled to the network interface. The processor is configured to transmit a first request for operational data to the vehicle, receive the requested operational data from the vehicle, the requested operational data including at least one event indicator, and retrieve the support data that corresponds to a selected event indicator from a stored location.

In other embodiments, a method is provided for acquiring integrated operational data and support data regarding the vehicle. The vehicle comprises a remote device interface for managing connections between the vehicle and at least one remote device. The method comprising transmitting a connection request to the remote device interface, maintaining a record of each connection with the vehicle, transmitting a first request for operational data to the vehicle, and receiving the requested operational data from the vehicle.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Embodiments of the present invention may be described herein in terms of functional and/or logical block components and various processing steps. It should be appreciated that such block components may be realized by any number of hardware, software, and/or firmware components configured to perform specific functions. For example, an embodiment of the invention may employ various integrated circuit components (e.g., memory elements, digital signal processing elements, logic elements, look-up tables, or the like) which may carry out a variety of functions under the control of one or more microprocessors or other control devices. In addition, those skilled in the art will appreciate that embodiments of the present invention may be practiced in conjunction with any number of vehicle stability control systems, and that the vehicle stability control system described herein is merely one exemplary embodiment.

In addition, the connecting lines shown in various figures contained herein are intended to represent exemplary functionally relationships and/or physical couplings between the various elements. It should be noted that many alternative or additional functional relationships or physical connections may be present in an embodiment of the present invention.

Figure 1:
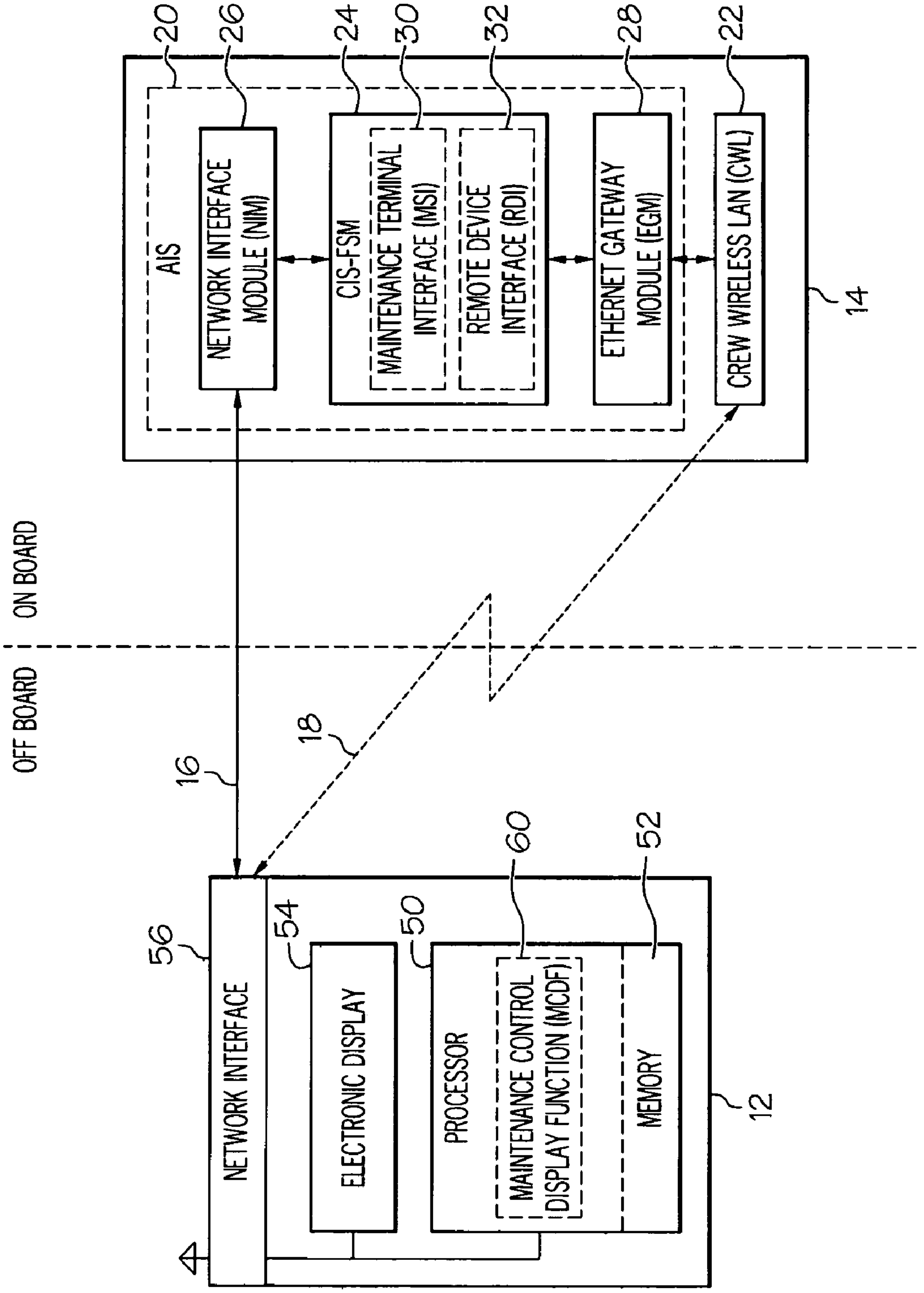
FIG. 1 is a block diagram of an exemplary remote device that is configured to communicate with an aircraft communication system.

FIG. 1 is a block diagram depicting an exemplary remote device 12 configured to communicate with an Aircraft Communication System (ACS) 14. As further described below, a user (e.g., a mechanic or other maintenance personnel) utilizes remote device 12 to acquire operational data from the ACS 14. This operational data may include one or more event indicators each corresponding to an operational issue with the aircraft and associated with specific support data describing the operational issue. The user of remote device 12 may retrieve and view this support data. As depicted, remote device 12 communicates with ACS 14 via a wired communication link 16 or a wireless communication link 18. As used herein, the term "operational data" refers to any data that describes the operational state of a vehicle. In addition, the term "support data" refers to any data that describes maintenance, troubleshooting, support, diagnostics, and repair procedures of the various systems of the vehicle. Although embodiments of the present invention are described herein with regard to an aircraft, it will be apparent to one who is skilled in the art that other vehicles may also be used in connection with other embodiments of the present invention.

ACS 14 provides operational data regarding the aircraft to one or more remote devices (e.g., such as remote device 12). As depicted, the ACS 14 includes a Aircraft Information System (AIS) 20 and a Crew Wireless LAN (CWL) 22. AIS 20 comprises at least one secure network providing connectivity to a plurality of aircraft systems, including one or more aircraft maintenance systems such as a Central Maintenance System (CMS), an Aircraft Condition Monitoring System (ACMS), and a Data Load System (DLS). Theses aircraft maintenance systems collect and store operational data that is generated by various aircraft systems and LRUs. In addition, AIS 20 includes a Crew Information System File Server Module (CIS-FSM) 24, a Network Interface Module (NIM) 26, and an Ethernet Gateway Module (EGM) 28. AIS 20 may also include a AIS Firewall to restrict access by unauthorized devices and computer systems.

NIM 26 and the CWL 22 each comprise network interfaces that communicate with the remote device 12 via the wired communication link 16 and the wireless communication link 18, respectively. NIM 26 enables an authorized remote device 12 to connect to the AIS 20 via the wired communication link 16. CWL 22 communicates with the AIS 20 via the EGM 28, enabling remote device 12 to connect to the AIS 20 via the wireless communication link 18.

CIS-FSM 24 provides data services (e.g., data retrieval and delivery) to the devices and systems that are connected via the AIS 20. All requests for operational data that is collected and stored on the aircraft systems are made to the CIS-FSM 24. CIS-FSM 24 includes a Maintenance System Interface (MSI) 30 and a Remote Device Interface (RDI) 32 that enable one or more remote devices (e.g., such as remote device 12) to establish a connection with AIS 20 in order to request, and receive, operational data that is collected and stored by the aircraft maintenance systems (e.g., CMC, ACM, etc.).

RDI 32 manages the connections between one or more remote devices and AIS 20. In some embodiments, RDI 32 supports a plurality of connection types (e.g., a "limited" connection and a "full" connection). For example, a "full" connection may provide the remote device with unrestricted access to the operational data, whereas, a "limited" connection would provide only restricted access. The connection type is determined at the time that the connection is established.

Access to RDI 32 is not restricted by the AIS Firewall, enabling the remote devices to transmit connection requests directly to the RDI 32. Upon receiving a connection request, RDI 32 determines if the AIS 20 is able to support the connection, authenticates the identity of the remote device, and transmits a connection confirmation message to the remote device. In addition, RDI 32 directs the AIS Firewall to allow the connected remote device to communicate with MSI 30.

RDI 32 maintains a remote device connection record that describes the connections between AIS 20 and each connected remote device. The remote device connection record may include the network address of the remote device and the connection type (e.g., "restricted" or "full") for each connection. RDI 32 updates the remote device connection data each time that it establishes a new connection with a remote device.

In addition, as further described below each remote device that is connected to AIS 20 periodically (e.g., once every 30 seconds) transmits a remote device status message to RDI 32. The remote device status message describes every connection between the remote device and AIS 20, including connections made by third-party applications not otherwise known to RDI 32. Upon receiving a remote device status message, RDI 32 updates the remote device connection record to reflect any unknown connections. Further, if RDI 32 detects that a connected remote device is no longer transmitting remote device status messages, it terminates the connection between the remote device and AIS 20 by, for example, removing the remote device from the remote device connection record Finally, RDI 32 may periodically broadcast a AIS status message to one or more remote devices via the wired communication link 16 and/or the wireless communication link 18. This AIS status message describes all of the current connections between AIS 20 and a remote device. The remote devices utilize this information to determine if they are still connected to the AIS 20.

MSI 30 enables authorized remote devices to request, and receive, operational data that is collected and stored by the aircraft maintenance systems (e.g., CMC, ACM, etc.). As further described below, MSI 30 receives an operational data request from a remote device and queries RDI 32 to determine if the remote device is authorized to receive the operational data. If the remote device is authorized, MSI 30 retrieves the requested operational data from the appropriate aircraft maintenance system and transmits the operational data to the remote device.

Remote device 12 may be a mobile device, such as a laptop computer, a Personal Digital Assistant (PDA), or another suitable mobile device. It may be positioned either onboard or outside of the aircraft. As depicted, remote device 12 includes a processor 50, memory 52, an electronic display 54, and a network interface 56. Network interface 56 is coupled to processor 50 and is configured to communicate with NIM 26 via wired communication link 16 or with CWL 22 via wireless communication link 18.

Processor 50 may comprise any type of processor or multiple processors, single integrated circuits such as a microprocessor, or any suitable number of integrated circuit devices and/or circuit boards working in cooperation to accomplish the functions of a processing unit. During operation, processor 50 executes one or more programs preferably stored within memory 52. The memory 52 can be any type of suitable memory. This would include the various types of Dynamic Random Access Memory (DRAM) such as SDRAM, the various types of static RAM (SRAM), and the various types of non-volatile memory (PROM, EPROM, and flash). It should be understood that memory 52 may be a single type of memory component, or it may be composed of many different types of memory components.

Processor 50 is configured to execute software that implements a Maintenance Control Display Function (MCDF) 60. As further described below, MCDF 60 presents multiple interfaces to the user of remote device 12 via the electronic display 54. These user interfaces enable the user of remote device 12 to direct the MCDF 60 to establish a connection with AIS 20 and acquire operational data that is collected and stored by the aircraft maintenance systems from MSI 30. As further described below, the operational data may include one or more event identifiers that correspond to an operational issue with the aircraft. The user of remote device 12 may select these event identifiers to retrieve support data describing the operational issue from a stored location.

Further, MCDF 60 stores information in memory 52 describing each connection between the remote device 12 and the AIS 20, including the connection type. This data includes not only connections that are established by the MCDF 60 but also connections established by third-party applications that are running on the remote device 12. MCDF 60 updates this stored information when it establishes a new connection with AIS 20. In addition, MCDF 60 utilizes this stored information to transmit periodic remote device status messages to the RDI 32. These periodic status messages describe each of the connections between remote device 12 and RDI 32. The connection between AIS 20 and MCDF 60 is terminated if MCDF 60 stops transmitting the periodic remote device connection messages. In addition, as described above RDI 32 periodically broadcasts AIS status messages listing all of the connections between AIS 20 and each connected remote device. MCDF 60 parses the AIS status message to determine whether it is still connected to AIS 20.

Figure 2:
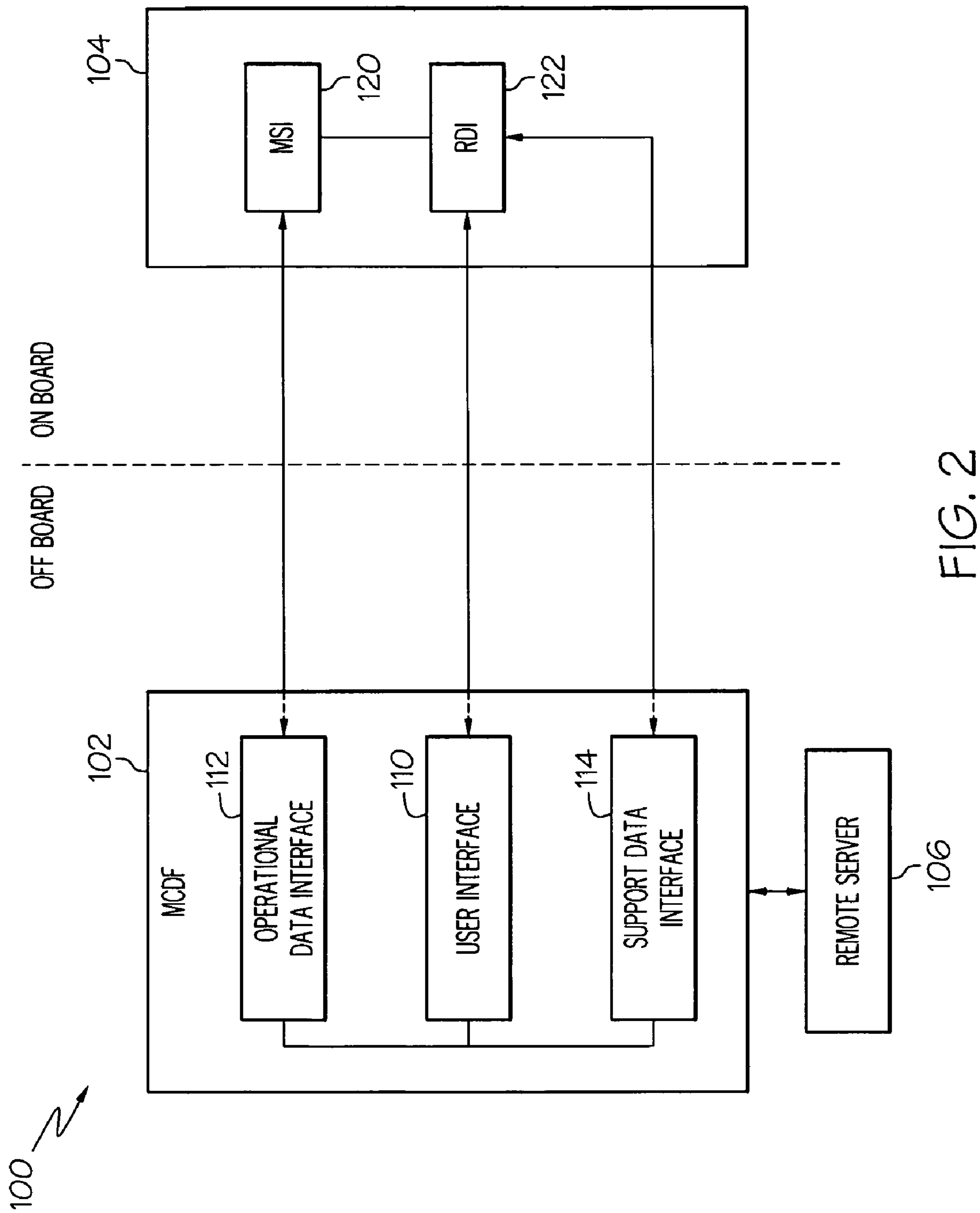
FIG. 2 is a block diagram depicting a method 100 for acquiring integrated operational data and support data according to one embodiment of the present invention.

FIG. 2 is a block diagram of a system 100 for acquiring integrated operational data and support data for a vehicle. As depicted, system 100 includes the MCDF 102, AIS 104, and a remote server 106. As described above, MCDF 102 is implemented by a processor on a remote device (e.g., the processor 50 for remote device 12 of FIG. 1). MCDF 102 includes a user interface 110, an operational data interface 112, and a support data interface 114. As further described below, these interfaces enable a user of the remote device to issue commands directing MCDF 102 to establish a connection with AIS 104 and retrieve integrated operational data and support data regarding the aircraft. AIS 104 includes the MSI 120 and RDI 122.

User interface 110 enables the user of the remote device to issue commands directing MCDF 102 to establish a connection with AIS 104. For example, user interface 110 may be a graphical user interface having controls (e.g., buttons, lists, etc.) that the user may use to cause MCDF 102 to establish a connection with AIS 104. In response, MCDF 102 transmits a connection request to RDI 122. The connection request includes information regarding the desired connection and may include an access level (e.g., "full" or "limited") for the desired connection.

Upon receiving the connection request, RDI 122 determines if AIS 104 is able to support the requested connection. AIS 104 may be restricted to a limited number of connections with one or more remote devices at one time. This restriction may result from physical limitations (e.g., ACS 14 of FIG. 1 may only support a limited number of wired communication links and/or wireless communication links) or from non-physical limitations (e.g., the MSI 120 may only support communications with a limited number of remote devices at one time). Thus, RDI 122 determines if the requested connection would cause the AIS 104 to be connected to more than a threshold number of remote devices at one time. If RDI 122 determines that the requested connection violates one of the remote device connection restrictions for AIS 104, the requested connection is denied.

If AIS 104 is able to support the requested connection, RDI 122 establishes the connection with MCDF 102. To establish this connection, RDI 122 and MCDF 102 may perform various security and/or handshaking techniques that enable RDI 122 to authenticate the identity of MCDF 102. If these security and/or handshaking techniques are successful, RDI 122 transmits a connection response to MCDF 102 confirming the new connection. In addition, RDI 122 directs the AIS Firewall to allow MCDF 102 to communicate with MSI 120.

Operational data interface 112 enables the user of the remote device to view and request operational data from the AIS 104. In one embodiment, operational data interface 112 comprises a region on the electronic display where one or more data screens are rendered. These data screens are generated by the MSI 120 or one of the aircraft maintenance systems (e.g., the CMC, ACM, etc.) and transmitted to MCDF 102 by the MSI 120. In one embodiment, these data screens are transmitted to MCDF 102 in the form of one or more Java applets. For example, after establishing the connection with MCDF 102, the RDI 122 may direct MSI 120 to transmit a data screen to the MCDF 102 that is displayed on the operational data interface 112. The user of the remote device may then interact with this data screen to issue commands directing the MCDF 102 to request operational data from the MSI 120.

Upon receiving the request, MSI 120 then communicates with RDI 122 to verify that MCDF 102 is connected to AIS 104 and is authorized to receive the requested operational data (e.g., that the access level of the connection type for the MCDF 102 matches the access level of the requested operational data). If the MSI 120 determines that the remote device is authorized, MSI 120 retrieves the operational data from the appropriate aircraft maintenance system (e.g., CMC, ACM, etc.) and transmits it to the MCDF 102. The operational data may be in the form of a Java applet that is configured to render additional data screens. MCDF 102 displays the requested operational data in the operational data interface.

The operational data may include one or more event indicators that each represents an operational issue with the aircraft and is associated with support data that may be retrieve from a stored location. The stored location may be the memory for the remote device (e.g., memory 52 of FIG. 1) or a remote server (e.g., remote server 106). In one embodiment, the support data includes one or more electronic documents that describe the operational issue and provide additional maintenance, repair, and/or troubleshooting information. These electronic documents may include portions of an Aircraft Maintenance Manual or a Fault Isolation Manual.

The user of the remote device issues a command directing MCDF 102 to retrieve the support data that corresponds to the event indicator. This support data is displayed in the support data interface 114 on the electronic display. For example, the user may select a link in the operational data interface 112 that represents the event indicator. In response, MCDF 102 would retrieve the appropriate support data and display it in the support data interface 114. If the support data is stored in memory on the remote device, MCDF 102 retrieves the support data from memory. On the other hand, if the support data is stored on the remote server 106, MCDF 102 requests the data from Remote Server 106. Remote Server 106 then transmits the requested support data back to MCDF 102.

Finally, the support data may include links or other controls that may be selected by the user of the remote device to request additional operational data regarding the aircraft. For example, the support data may direct the user to interrogate one of the aircraft maintenance systems for the results of a built-in-test conducted by an LRU or for other stored data. In this case, when the user selects the link or control MCDF 102 transmits a request for the corresponding operational data to RDI 122. RDI 122 verifies that MCDF 102 is currently connected and authorized to receive the data. The RDI 122 then directs MSI 120 to transmit the requested operational data to the MCDF 102. The requested operational data is then displayed in the operational data interface.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A remote device for acquiring integrated operational data and support data regarding a vehicle, the remote device comprising:
- a network interface configured to communicate with the vehicle; and
- a processor, coupled to the network interface and configured to:
  - transmit a first request for operational data to the vehicle;
  - receive the requested operational data from the vehicle, the requested operational data including at least one selectable event indicator; and
  - retrieve the support data that corresponds to a selected event indicator.

2. The remote device of claim 1, wherein the vehicle comprises a remote device interface configured to manage a connection between the vehicle and one or more remote devices and wherein the processor is further configured to transmit a connection request to the remote device interface prior to transmitting the first request, wherein the connection authorizes the remote device to receive the operational data from the vehicle.

3. The remote device of claim 2, wherein the processor is further configured to maintain a record of each connection between the remote device and the vehicle.

4. The remote device of claim 3, wherein the vehicle further comprises a maintenance system interface configured to transmit requested operational data to one or more authorized devices and the processor is further configured to:

transmit a request operational data to the maintenance system interface; and receive the requested operational data from the maintenance system interface, if the remote device is currently authorized to receive the operational data.

5. The remote device of claim 4, wherein the support data comprises at least one electronic document that describes an operational issue associated with the selected event indicator.

6. The remote device of claim 5, wherein the processor is further configured to retrieve the support data from a remote server.

7. The remote device of claim 1, wherein a user of the remote device may request additional operational data from the vehicle based on the support data.

8. The remote device of claim 2, wherein the network interface comprises a wireless network interface configured to establish a wireless communication link with the vehicle.

9. The remote device of claim 3, wherein the processor is further configured to periodically transmit a first status message to the remote device interface, wherein the first status message identifies the connections between the remote device and the vehicle.

10. The remote device of claim 9, wherein the processor is further configured to:

periodically receive a second status message from the remote device interface, the periodic status message describing each connection between the vehicle and one or more devices; and analyze the second status message to determine if the remote device and the vehicle are currently connected.

11. A method for acquiring integrated operational data and support data for a vehicle, the vehicle comprising a remote device interface for managing a plurality of connections between the vehicle and at least one remote device, the method comprising:

requesting a connection with the remote device interface;

maintaining a record of each connection with the vehicle;

transmitting a first request for operational data to the vehicle; and receiving the requested operational data from the vehicle.

12. The method of claim 11, wherein the vehicle further comprises a maintenance system interface for transmitting requested operational data to the at least one remote device; and wherein the step of transmitting the first request further comprises transmitting the first request for operational data to the maintenance system interface; and the step of receiving the requested operational data further comprises receiving the requested operational data from the maintenance system interface.

13. The method of claim 11, wherein the requested operational data comprises a selectable event indicator that is associated with an operational issue and the method further comprises:

retrieving the support data that corresponds to a selected event indicator from a stored location.

14. The method of claim 11, wherein the step of retrieving further comprises retrieving support data that corresponds to a selected event indicator from a remote server.

15. The method of claim 12, further comprising:

transmitting a second request for operational data to the remote device interface; and receiving the requested operational data from the maintenance system interface.

16. A system configured to provide integrated operational data and support data regarding a vehicle to at least one remote device, the system comprising:

a network interface configured to communicate with the at least one remote device;

a remote device interface coupled to the network interface configured to:

manage connections between the vehicle and the at least one remote device, receive a request for a connection from the at least one remote device;

determine when the vehicle is able to support the connection; and a maintenance system interface coupled to the network interface and the remote device interface configured to transmit operational data to the at least one remote device.

17. The system of claim 16, wherein the remote device interface is further configured to:

authorize the at least one remote device to receive operational data from the maintenance system interface, when the vehicle is able to support the connection.

18. The system of claim 17, wherein the remote device interface is further configured to maintain a remote device connection record describing each connection between the vehicle and each remote device.

19. The system of claim 18, wherein the maintenance system interface is further configured to:

receive a first request for operational data from the at least one remote device;

communicate with the remote device interface to determine if the at least one remote device is authorized to receive the requested operational data; and transmit the requested operational data to the at least one remote device, if the at least one remote device is authorized.

20. The system of claim 19, wherein the remote device interface is further configured to:

receive a second request for operational data from the at least one remote device;

determine if the at least one remote device is authorized to receive the requested operational data; and direct the maintenance system interface to transmit the requested operational data to the at least one remote device, if the at least one remote device is authorized.

* * * * *